US012241960B1

(12) United States Patent
Naroditsky et al.

(10) Patent No.: US 12,241,960 B1
(45) Date of Patent: Mar. 4, 2025

(54) DETERMINING RELATIVE ELECTRONIC DEVICE POSITIONING BASED ON FUSING ULTRA-WIDEBAND DATA AND VISUAL DATA

(71) Applicant: Apple Inc., Cupertino, CA (US)

(72) Inventors: Oleg Naroditsky, San Francisco, CA (US); Xing Zheng, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 219 days.

(21) Appl. No.: 17/008,767

(22) Filed: Sep. 1, 2020

Related U.S. Application Data

(60) Provisional application No. 62/896,891, filed on Sep. 6, 2019.

(51) Int. Cl.
| | |
|---|---|
| *G01S 13/02* | (2006.01) |
| *G01S 13/42* | (2006.01) |
| *G01S 13/86* | (2006.01) |
| *G06T 7/579* | (2017.01) |
| *G06T 7/77* | (2017.01) |
| *G06T 19/00* | (2011.01) |

(52) U.S. Cl.
CPC .......... *G01S 13/0209* (2013.01); *G01S 13/42* (2013.01); *G01S 13/867* (2013.01); *G06T 7/579* (2017.01); *G06T 7/77* (2017.01); *G06T 19/006* (2013.01)

(58) Field of Classification Search
CPC ... G01S 1/00; G01S 3/00; G01S 17/00; G01S 19/00; G01S 2205/00
See application file for complete search history.

(56) References Cited

U.S. PATENT DOCUMENTS

| | | | | |
|---|---|---|---|---|
| 5,262,789 A | * | 11/1993 | Silverstein | H01Q 3/22 |
| | | | | 342/368 |
| 7,136,016 B1 | * | 11/2006 | Swensen | G08G 5/0043 |
| | | | | 342/455 |
| 8,115,814 B2 | * | 2/2012 | Iwase | G08B 13/19656 |
| | | | | 396/54 |
| 8,259,102 B2 | * | 9/2012 | Lim | G06T 13/40 |
| | | | | 345/473 |
| 8,648,799 B1 | * | 2/2014 | Lloyd | G06F 3/0346 |
| | | | | 345/169 |

(Continued)

*Primary Examiner* — Peter D Le
(74) *Attorney, Agent, or Firm* — Thompson Hine LLP

(57) ABSTRACT

Various implementations disclosed herein include devices, systems, and methods that determine a transform relating poses of two mobile electronic devices using range date from a ultra-wideband (UWB) sensor and movement data from captured images. In some implementations, a distance is determined between a first mobile device and a second mobile device based on a UWB signal transmitted between the first mobile device and the second mobile device. In some implementations, first movement data corresponding to movement of the first mobile device and second movement data corresponding to movement of the second mobile device are received. The first movement data based on a camera or a sensor on the first mobile device. The second movement data is based on a camera or a sensor on the second mobile device. Then, a transform is determined that relates a pose of the first mobile device to a pose of the second mobile device based on the distance, the first movement data, and the second movement data.

20 Claims, 10 Drawing Sheets

(56) References Cited

U.S. PATENT DOCUMENTS

| | | | |
|---|---|---|---|
| 10,145,947 B2* | 12/2018 | Borggaard | G01S 11/14 |
| 10,306,394 B1* | 5/2019 | Zhu Jin | H04R 5/02 |
| 10,318,811 B1* | 6/2019 | Gold | G06T 19/006 |
| 10,334,331 B2 | 6/2019 | Al-Stouhi et al. | |
| 10,338,196 B2 | 7/2019 | Al-Stouhi et al. | |
| 10,365,363 B2* | 7/2019 | Rohr | G01S 5/0263 |
| 10,412,545 B1* | 9/2019 | Liu | H04W 76/14 |
| 2003/0025798 A1* | 2/2003 | Grosvenor | G06V 40/193 |
| | | | 348/207.99 |
| 2003/0105583 A1* | 6/2003 | Aloi | G01S 13/878 |
| | | | 340/988 |
| 2004/0202351 A1* | 10/2004 | Park | G05D 1/0234 |
| | | | 382/104 |
| 2005/0008256 A1* | 1/2005 | Uchiyama | G06T 7/80 |
| | | | 382/291 |
| 2007/0257839 A1* | 11/2007 | Srinivasan | H04W 64/003 |
| | | | 342/458 |
| 2008/0086268 A1* | 4/2008 | Okuda | G01S 15/931 |
| | | | 340/436 |
| 2008/0089298 A1* | 4/2008 | Anschutz | G08G 1/012 |
| | | | 370/338 |
| 2008/0207226 A1* | 8/2008 | Shen | G01S 5/12 |
| | | | 455/456.6 |
| 2009/0039871 A1* | 2/2009 | Laforest | G01V 3/081 |
| | | | 324/207.11 |
| 2010/0171642 A1* | 7/2010 | Hassan | B60C 23/0479 |
| | | | 340/992 |
| 2012/0061458 A1* | 3/2012 | Bahr | G06K 7/10792 |
| | | | 235/375 |
| 2012/0088526 A1* | 4/2012 | Lindner | H04W 4/023 |
| | | | 455/457 |
| 2012/0294583 A1* | 11/2012 | Kosaka | G06T 13/80 |
| | | | 386/E5.028 |
| 2013/0182894 A1* | 7/2013 | Kim | G06T 7/246 |
| | | | 382/103 |
| 2013/0257822 A1* | 10/2013 | Holmgren | G06F 3/0428 |
| | | | 345/178 |
| 2014/0362193 A1* | 12/2014 | Kanetake | G06T 7/579 |
| | | | 348/50 |
| 2015/0148072 A1* | 5/2015 | Snyder | H04W 4/025 |
| | | | 455/456.2 |
| 2015/0310619 A1* | 10/2015 | Cao | G06T 7/579 |
| | | | 348/142 |
| 2016/0253806 A1* | 9/2016 | Iimura | G06T 7/74 |
| | | | 382/220 |
| 2017/0208549 A1* | 7/2017 | Desai | G06F 1/3287 |
| 2017/0270762 A1* | 9/2017 | Liu | H04B 17/23 |
| 2018/0151036 A1* | 5/2018 | Cha | H04R 29/001 |
| 2018/0286078 A1* | 10/2018 | Kimoto | B60R 11/04 |
| 2018/0299527 A1* | 10/2018 | Helwani | H04R 1/406 |
| 2019/0049242 A1* | 2/2019 | Adams | G01C 25/00 |
| 2019/0113347 A1* | 4/2019 | Kim | G01C 21/1652 |
| 2019/0122378 A1* | 4/2019 | Aswin | G06T 7/20 |
| 2019/0178646 A1* | 6/2019 | Roumeliotis | G05D 1/0274 |
| 2019/0221000 A1* | 7/2019 | Li-Chee-Ming | G06T 7/75 |
| 2019/0285421 A1* | 9/2019 | Johnston | G08G 1/0129 |
| 2019/0362554 A1* | 11/2019 | Chen | H04M 1/72439 |
| 2019/0383627 A1* | 12/2019 | Nangeroni | B60W 50/0098 |
| 2020/0090366 A1* | 3/2020 | Korjus | G01C 21/3602 |
| 2020/0124406 A1* | 4/2020 | Gorschenew | H04N 17/002 |
| 2020/0341486 A1* | 10/2020 | Dia | G05D 1/0253 |
| 2020/0402249 A1* | 12/2020 | Kim | G06T 7/579 |
| 2021/0256765 A1* | 8/2021 | Huo | H04W 4/023 |
| 2021/0382495 A1* | 12/2021 | Hoyer | G01S 13/89 |
| 2022/0009445 A1* | 1/2022 | Huschenbett | G08C 17/02 |
| 2022/0017117 A1* | 1/2022 | Yamamoto | G01S 13/726 |
| 2022/0042823 A1* | 2/2022 | Lee | G01C 11/30 |
| 2022/0050172 A1* | 2/2022 | Moulton | G01S 17/86 |
| 2022/0075048 A1* | 3/2022 | Ikeda | G01S 13/42 |
| 2022/0081873 A1* | 3/2022 | Huissoon | E02F 3/437 |

* cited by examiner

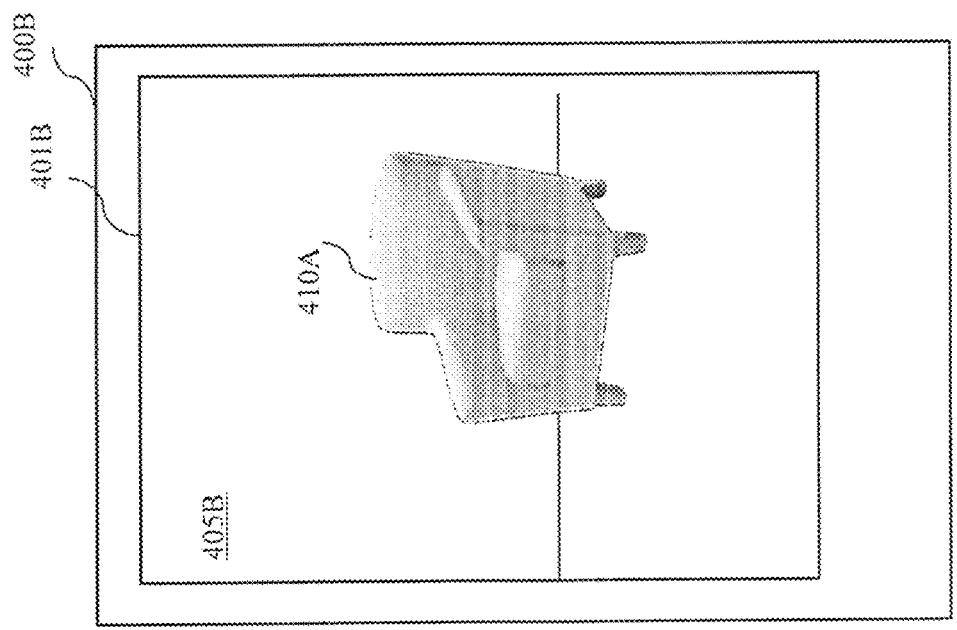
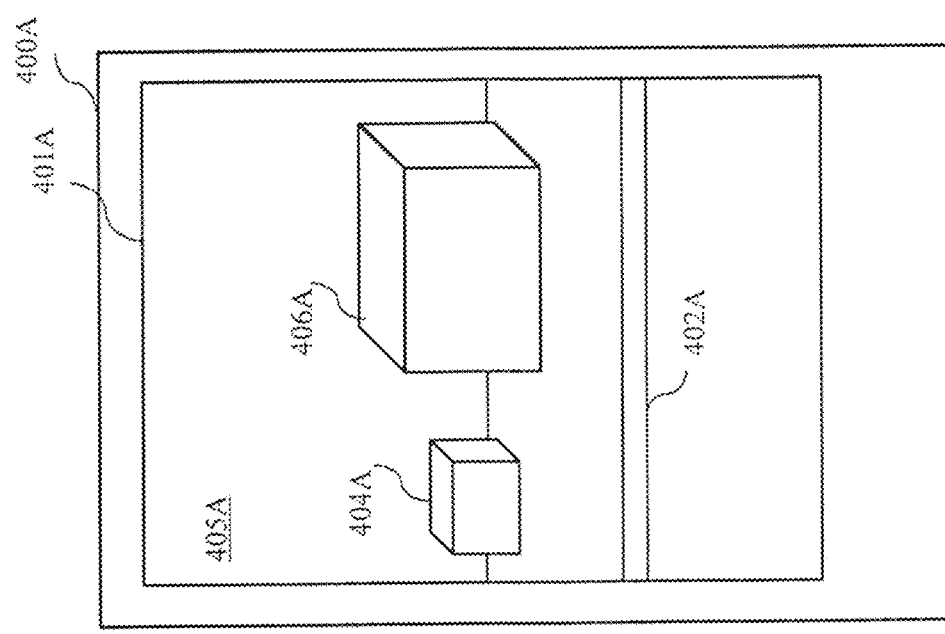
FIGURE 4B

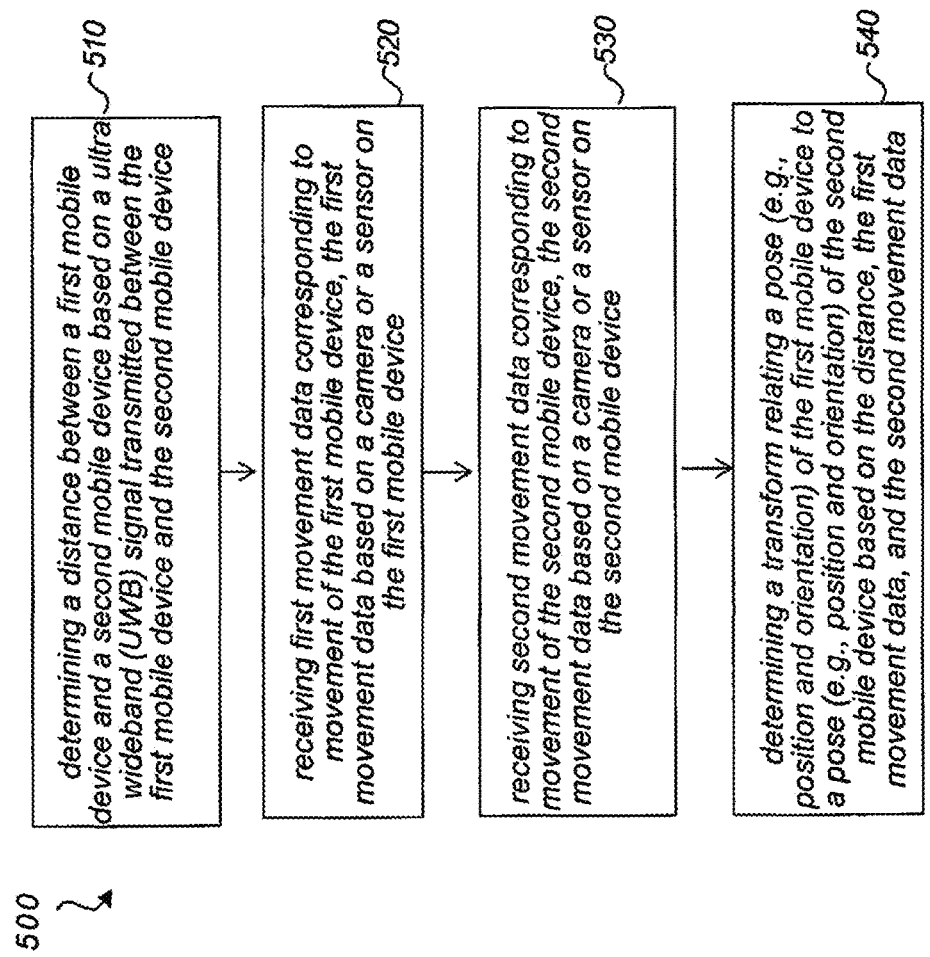

DETERMINING RELATIVE ELECTRONIC DEVICE POSITIONING BASED ON FUSING ULTRA-WIDEBAND DATA AND VISUAL DATA

CROSS-REFERENCE TO RELATED APPLICATION

This Application claims the benefit of U.S. Provisional Application Ser. No. 62/896,891 filed Sep. 6, 2019, which is incorporated herein in its entirety.

TECHNICAL FIELD

The present disclosure generally relates to electronic devices, and in particular, to systems, methods, and devices for determining relative positions and orientations of electronic devices using ultra-wideband (UWB) sensor data and visual data.

BACKGROUND

Existing techniques for determining the relative positions and orientations between two or more electronic devices may not be as accurate, efficient, and effective as desired or needed for some circumstances.

SUMMARY

Various implementations disclosed herein include devices, systems, and methods that determine relative positions and/or orientations between two or more electronic devices by fusing UWB data and movement data. In some implementations, a transform relating poses (e.g., position, orientation, or both) of two or more mobile electronic devices is determined using range data from a UWB sensor and movement data of the mobile electronic devices. In some implementations, the two or more mobile electronic devices can determine their relative poses without overlapping visual data from the physical environment. This capability may facilitate or improve a variety of multi-device use cases. For example, the ability to determine relative device poses without overlapping visual data from a physical environment may facilitate co-presence or interactions in a computer-generated reality (CGR) environment.

Some implementations involve a method of determining relative positions, orientations, or both between two or more mobile devices by fusing UWB data and movement data. The method may be performed at an electronic device having a processor. For example, the processor may execute instructions stored in a non-transitory computer-readable medium to determine the relative positions, orientations, or both between the two or more mobile devices. The method determines a distance between a first mobile device and a second mobile device based on a UWB signal transmitted between the first mobile device and the second mobile device. The UWB signal is transmitted or received in either direction or both directions between the first mobile device and the second mobile device.

The method receives first movement data corresponding to movement of the first mobile device. The first movement data may be based on a camera or a sensor on the first mobile device. For example, multiple camera images from the camera on the first mobile device may be compared to determine a movement of the first mobile device. The first movement data may be used to determine a pose (e.g., position, orientation, or both) of the first mobile device in a first 3D coordinate space. In some implementations, the method uses one or more camera images and a Visual Inertial Odometry (VIO) technique to determine a current pose of the first mobile device in the first 3D coordinate space. In some implementations, a current pose of the first mobile device is determined based on a prior pose (e.g., starting pose) of the first mobile device and a movement of the first mobile device that occurred since the prior pose.

Similarly, the method receives second movement data corresponding to movement of the second mobile device. For example, multiple camera images from the camera on the second mobile device may be compared to determine a movement of the second mobile device. The second movement data may be used to determine a pose (e.g., position, orientation, or both) of the second mobile device in a second 3D coordinate space. In some implementations, the method uses one or more camera images and a Visual Inertial Odometry (VIO) technique to determine a current pose of the second mobile device in the second 3D coordinate space. In some implementations, a current pose of the second mobile device is determined based on a prior pose (e.g., starting pose) of the second mobile device and a movement of the second mobile device that occurred since the prior pose.

In some implementations, a transform is then determined that relates at least one pose of the first mobile device to at least one pose of the second mobile device based on the distances between the first mobile device and the second mobile device, the first movement data, and the second movement data. In one example, the first movement data is used to determine a pose of the first mobile device in a first 3D coordinate space and the inter-device distance indicates how far away the second mobile device is in that first 3D coordinate space. The direction (e.g., angle) of the second mobile device from the first device may be based on camera data. For example, given the first device's pose and an image in which the first device is detected, the direction from the first mobile device to the second mobile device may be determined when they have overlapped views. In another example, the direction from the first mobile device to the second mobile device may be determined based on the UWB data, e.g., the receiving devices may be configured to determine the direction from which an incoming signal is received. The relative orientations of the devices may be determined in various ways. In some implementations, each device includes sensors (e.g., accelerometers, gyroscopes, compasses, etc.) that provide the respective device's orientation relative to common global directions (e.g., north/south/east/west/up/down) that are the same for both of the coordinate systems of both of the mobile devices.

In accordance with some implementations, a non-transitory computer readable storage medium has stored therein instructions that are computer-executable to perform or cause performance of any of the methods described herein. In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIGS. 4A-4E are diagrams that illustrate an example scenario where multiple users in a physical environment share a multiuser computer-generated reality (CGR) environment.

FIG. 5 is a flowchart illustrating an exemplary method of determining a transform relating poses of two mobile electronic devices in a shared CGR environment using range data from a UWB sensor in accordance with some implementations. in accordance with some implementations.

Figure 1:
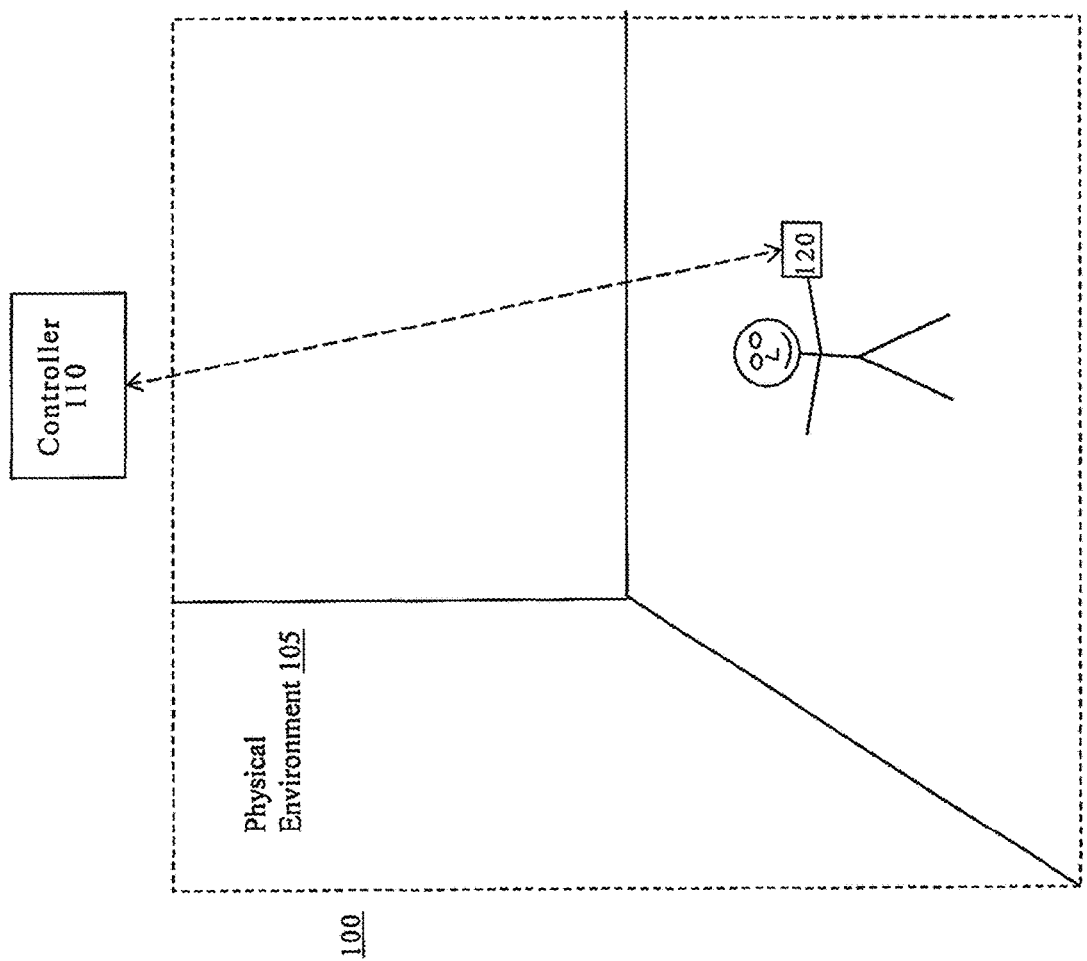
FIG. 1 is a block diagram of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Figure 2:
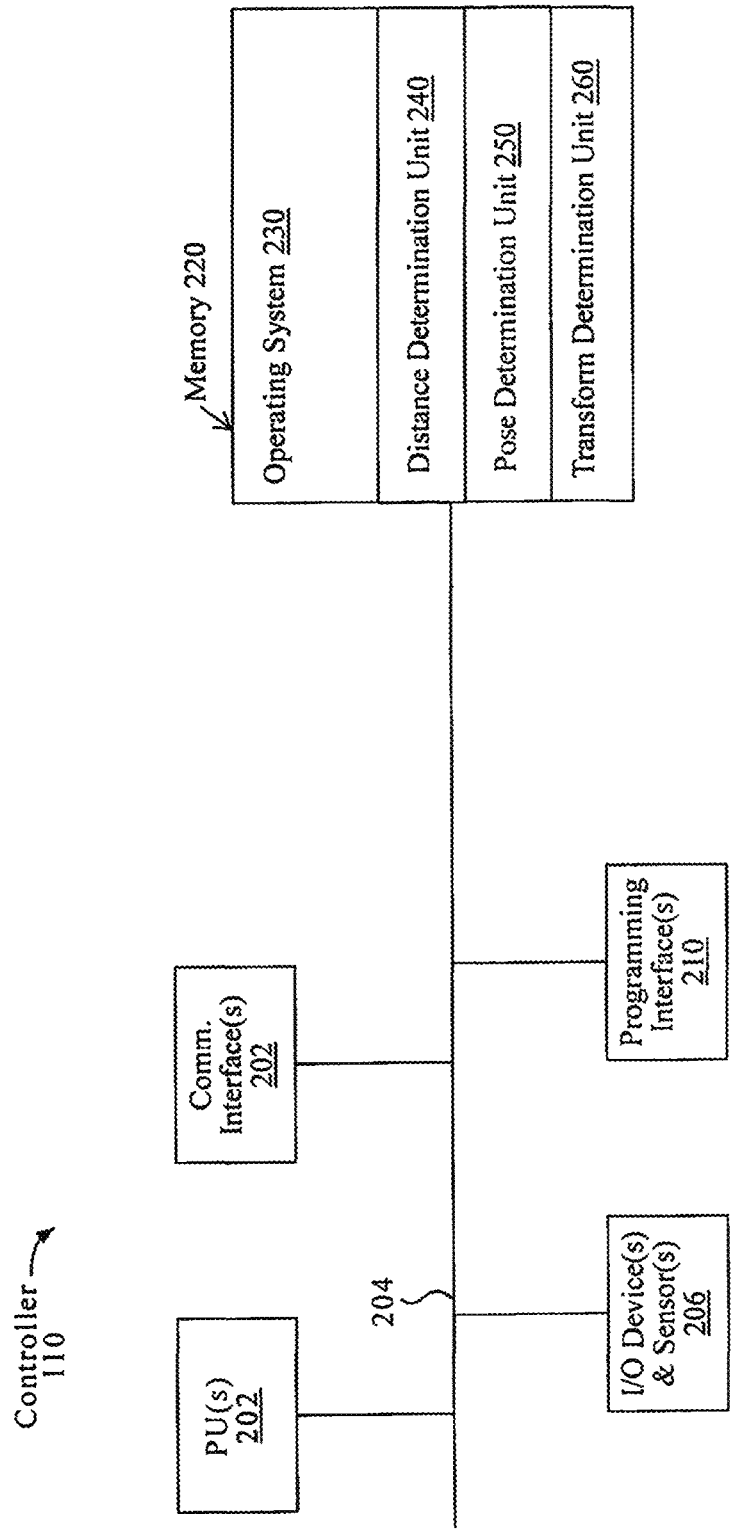
FIG. 2 is a block diagram of an example controller in accordance with some implementations.
Figure 3:
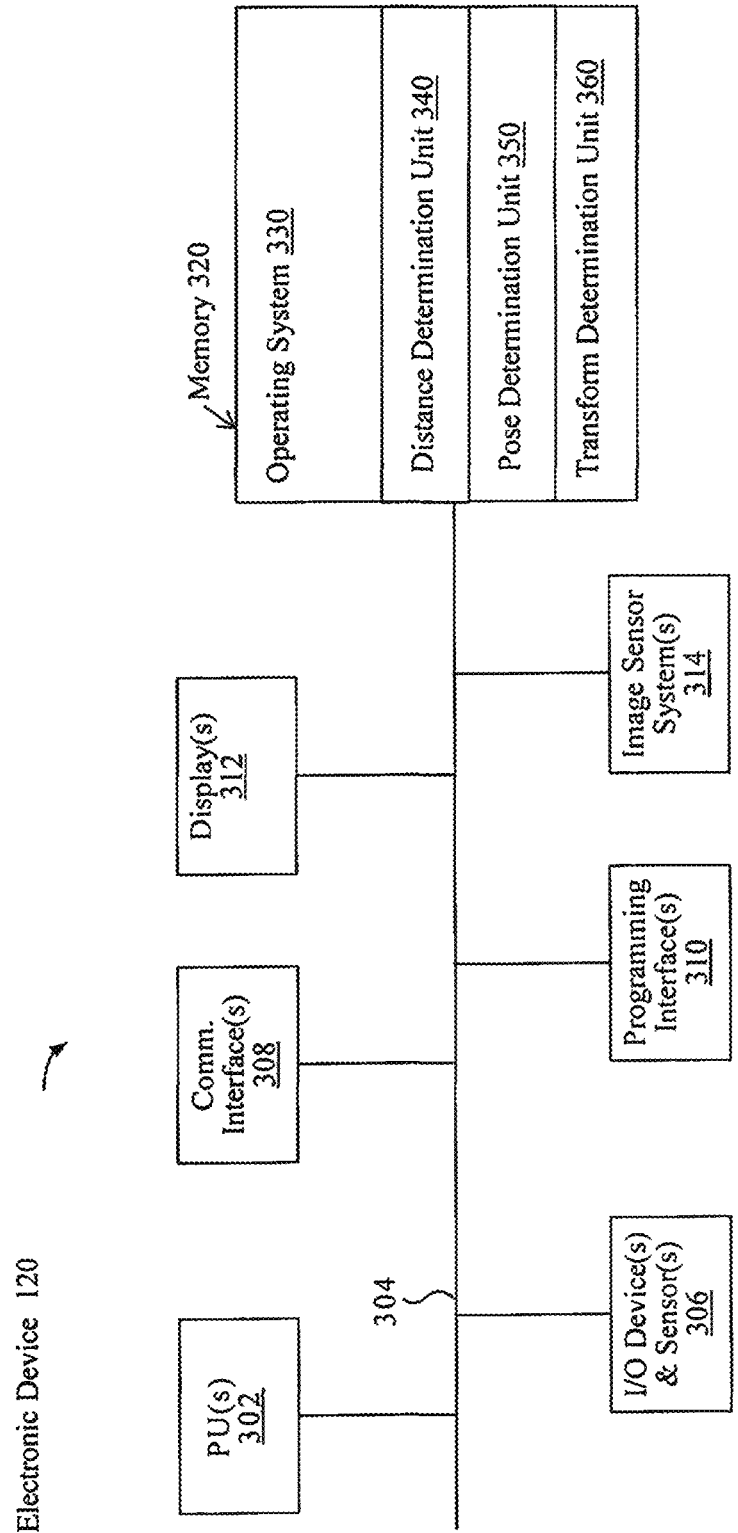
FIG. 3 is a block diagram of an example electronic device in accordance with some implementations.

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein. While FIGS. 1-3 depict exemplary implementations involving an electronic device, other implementations may involve other types of devices including, but not limited to, watches and other wearable electronic devices, mobile devices, laptops, desktops, gaming devices, head mounted device (HMD), home automation devices, and other devices that include or use image capture devices.

FIG. 1 is a block diagram of an example operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a controller 110 and an electronic device 120, one or both of which may be in a physical environment. A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In some implementations, the controller 110 is configured to manage and coordinate a computer-generated reality (CGR) environment for the user. In some implementations, the controller 110 includes a suitable combination of software, firmware, or hardware. The controller 110 is described in greater detail below with respect to FIG. 2. In some implementations, the controller 110 is a computing device that is local or remote relative to the physical environment 105.

In one example, the controller 110 is a local server located within the physical environment 105. In another example, the controller 110 is a remote server located outside of the physical environment 105 (e.g., a cloud server, central server, etc.). In some implementations, the controller 110 is communicatively coupled with the electronic device 120 via one or more wired or wireless communication channels 144 (e.g., BLUETOOTH, IEEE 802.11x, IEEE 802.16x, IEEE 802.3x, etc.).

In some implementations, the controller 110 and the electronic device 120 are configured to present the CGR environment to the user together.

In some implementations, the electronic device 120 is configured to present the CGR environment to the user. In some implementations, the electronic device 120 includes a suitable combination of software, firmware, or hardware. The electronic device 120 is described in greater detail below with respect to FIG. 3. In some implementations, the functionalities of the controller 110 are provided by or combined with the electronic device 120, for example, in the case of an electronic device that functions as a stand-alone unit.

According to some implementations, the electronic device 120 presents a CGR environment to the user while the user is present within the physical environment 105. A CGR environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality. A virtual reality (VR) environment refers to a simulated environment that is designed to be based entirely on computer-generated sensory inputs for one or more senses. A VR environment comprises virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality. An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the controller 110 includes one or more processing units 202 (e.g., microprocessors, application-specific integrated-circuits (ASICs), field-programmable gate arrays (FPGAs), graphics processing units (GPUs), central processing units (CPUs), processing cores, or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image capture devices or other sensors, one or more displays, or the like.

The memory 220 includes high-speed random-access memory, such as dynamic random-access memory (DRAM), static random-access memory (CGRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230, a distance determination unit 240, a pose determination unit 250, and transform determination unit 260.

The operating system 230 includes procedures for handling various basic system services and for performing hardware dependent tasks.

In some implementations, the distance determination unit 240 is configured to determine a distance (e.g., or distance and angle) between two or more mobile electronic devices based on a UWB signal transmitted therebetween. In some implementations, the pose determination unit 250 is configured to determine a pose (e.g., 3D position and orientation) of a mobile electronic device using movement data of the mobile electronic device based on a camera or a sensor on the mobile electronic device. In some implementations, the transform determination unit 260 is configured to determine a transform relating a pose of a first mobile electronic device to a pose of at least one additional mobile electronic device based on a plurality of paired poses of the mobile electronic devices and corresponding distances therebetween.

Although these modules and units are shown as residing on a single device (e.g., the controller 110), it should be understood that in other implementations, any combination of these modules and units may be located in separate computing devices. Moreover, FIG. 2 is intended more as functional description of the various features which are present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, or firmware chosen for a particular implementation.

FIG. 3 is a block diagram of an example of the electronic device 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the electronic device 120 includes one or more processing units 302 (e.g., microprocessors, ASICs, FPGAs, GPUs, CPUs, processing cores, or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, or the like type interface), one or more programming (e.g., I/O) interfaces 310, one or more displays 312, one or more interior or exterior facing image sensor systems 314, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a magnetometer, a gyroscope, an event-based camera, an ultrasound sensor, a radar sensor, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), or the like.

In some implementations, the one or more displays 312 are configured to present a CGR environment to the user. In some implementations, the one or more displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), or the like display types. In some implementations, the one or more displays 312 correspond to diffractive, reflective, polarized, holographic, etc. waveguide displays. For example, the electronic device 120 includes a single display. In another example, the electronic device 120 includes a display for each eye of the user.

The memory 320 includes high-speed random-access memory, such as DRAM, CGRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330, a distance determination unit 340, a pose determination unit 350, and transform determination unit 360.

The operating system 330 includes procedures for handling various basic system services and for performing hardware dependent tasks.

In some implementations, the distance determination unit 340 is configured to determine a distance (e.g., or distance and angle) between two or more mobile electronic devices based on a UWB signal transmitted therebetween. In some implementations, the pose determination unit 350 is configured to determine a pose (e.g., 3D position and orientation) of a mobile electronic device using movement data of the mobile electronic device based on a camera or a sensor on the mobile electronic device. In some implementations, the transform determination unit 360 is configured to determine a transform relating a pose of a first mobile electronic device to a pose of at least one additional mobile electronic device based on a plurality of paired poses of the mobile electronic devices and corresponding distances therebetween.

Moreover, FIG. 3 is intended more as a functional description of the various features which are present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, or firmware chosen for a particular implementation.

Figure 4A:
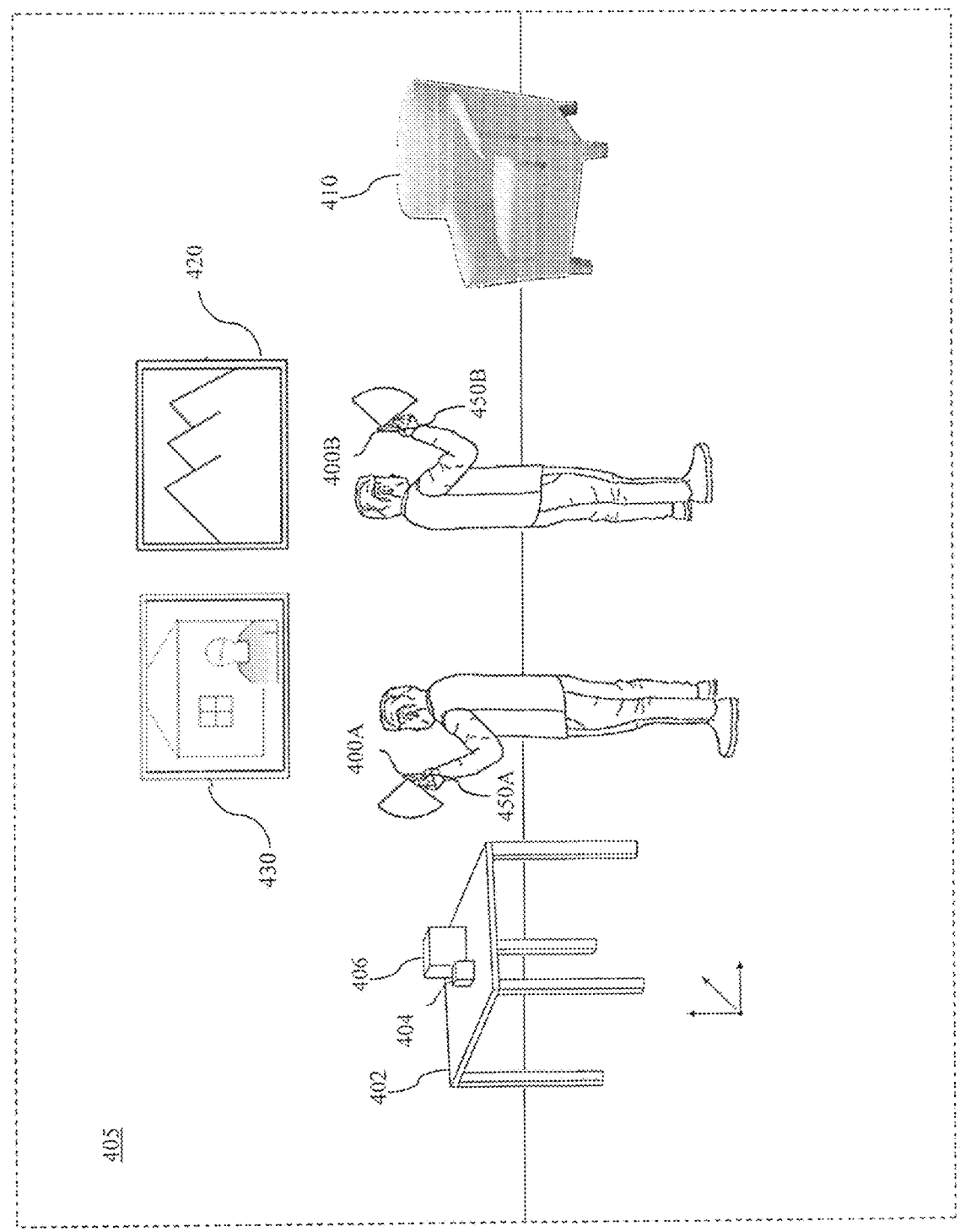

FIG. 4A illustrates an electronic device 400A and an electronic device 400B. The electronic device 400A or the electronic device 400B can include some or all of the features of one or both of the controller 110 and the electronic device 120.

FIGS. 4A-4E are diagrams that illustrate an example scenario where multiple users in a physical environment share a multiuser CGR environment. In some implementations, the electronic device 400A includes one or more UWB sensors 450A (e.g., UWB transmitter or UWB receiver). In some implementations, the electronic device 400B includes UWB sensor 450B (e.g., UWB transmitter or UWB receiver). In some implementations, a relative transformation between a first 3D coordinate system (e.g., poses) of the electronic device 400A and a second 3D coordinate system (e.g., poses) of the electronic device 400B is determined using range data (e.g., determined based on a UWB sensor receiving an inter-device signal) and poses of the electronic devices (e.g., determined based on movement data that is tracked by the electronic devices). As shown in FIGS. 4A-4E, the electronic device 400A and the electronic device 400B may share a multiuser CGR environment without overlapping visual data in some implementations.

In some implementations, the UWB sensors 450A and 450B each include a UWB receiver and a UWB transmitter. In some implementations, the UWB sensors 450A and 450B determine range using a time-of-flight (TOF) mechanism. In some implementations, the range or distance determined by the UWB sensors 450A and 450B is non-directional. Alternatively, in some implementations, the UWB sensors 450A and 450B include a multiple antennas and differences in timing of the arrival of the UWB transmission at the multiple antennas determines an angle of arrival and a range. In implementations using UWB sensors with the multiple antennas, a direction and a distance between the electronic devices 400A and 400B can be determined and used. In some implementations, the UWB sensors 450A and 450B determine range using line of sight (LOS) processing. In some implementations, the UWB sensors 450A and 450B determine range at a distance greater than 10 meters.

In various implementations, two users each begin an individual CGR environment in a shared physical environment. As shown in FIG. 4A, the electronic device 400A initiates a process for determining positioning of device 400A with respect to the physical environment using, for example, a VIO technique or SLAM technique. The electronic device 400A captures images of table 402, cube 404, and cube 406 via image sensor(s) located on the electronic device 400A.

As shown in FIG. 4B, the electronic device 400A displays corresponding representations of a table 402A, cube 404A, and cube 406A via CGR environment 405A on display 401A.

In some implementations, to determine its pose (e.g., position and orientation in space) with respect to the physical environment, the electronic device 400A uses the captured images in combination with data obtained via additional sensor(s) (e.g., motion sensors, depth sensors, orientation sensors, etc.) and corresponding sensor parameters. In some implementations, the electronic device 400A detects notable features from the captured images (e.g., lines, segments, planes, points, or other 3D geometric elements and shapes such as edges or corners of cubes 404 and 406 that are in the field of view of the image sensor) and estimates the positions of these features in 3D space while also estimating its own pose by iteratively reducing or minimizing an error function for the 3D position and orientation estimations using the captured images and data obtained via the image sensor and additional sensors.

In some implementations, the electronic device 400A may create and store a pose that includes an image, positions of features in the image, or the image sensor pose associated with the image. In some implementations, each stored pose can include an aligned image (e.g., RGB color) information and additional sensor information (e.g., depth information) associated with a camera pose (e.g., position and orientation in space) at a known time. The electronic device 400A may create and store a historical record of the relative image sensor (e.g., electronic device) movement, which is called a pose graph. In some implementations, poses are assigned or positioned along the pose graph and a current camera position can be highlighted. In accordance with some implementations, the pose graph is shown within a global point cloud of a current viewing episode.

As shown in FIG. 4A, the electronic device 400B also initiates a process for determining positioning of device 400B with respect to the physical environment using, for example, a VIO technique or SLAM technique. The electronic device 400B captures images of chair 410 via image sensor(s) located on the electronic device 400B. As shown in FIG. 4B, the electronic device 400B displays corresponding representations of a chair 410A via CGR environment 405B on display 401B.

The electronic device 400B may create and store a pose (e.g., position and orientation in space) that can include an image or positions of features in the image associated with the pose. The electronic device 400B may create and store a pose graph of the relative image sensor (e.g., electronic device) movement.

Figure 4C:
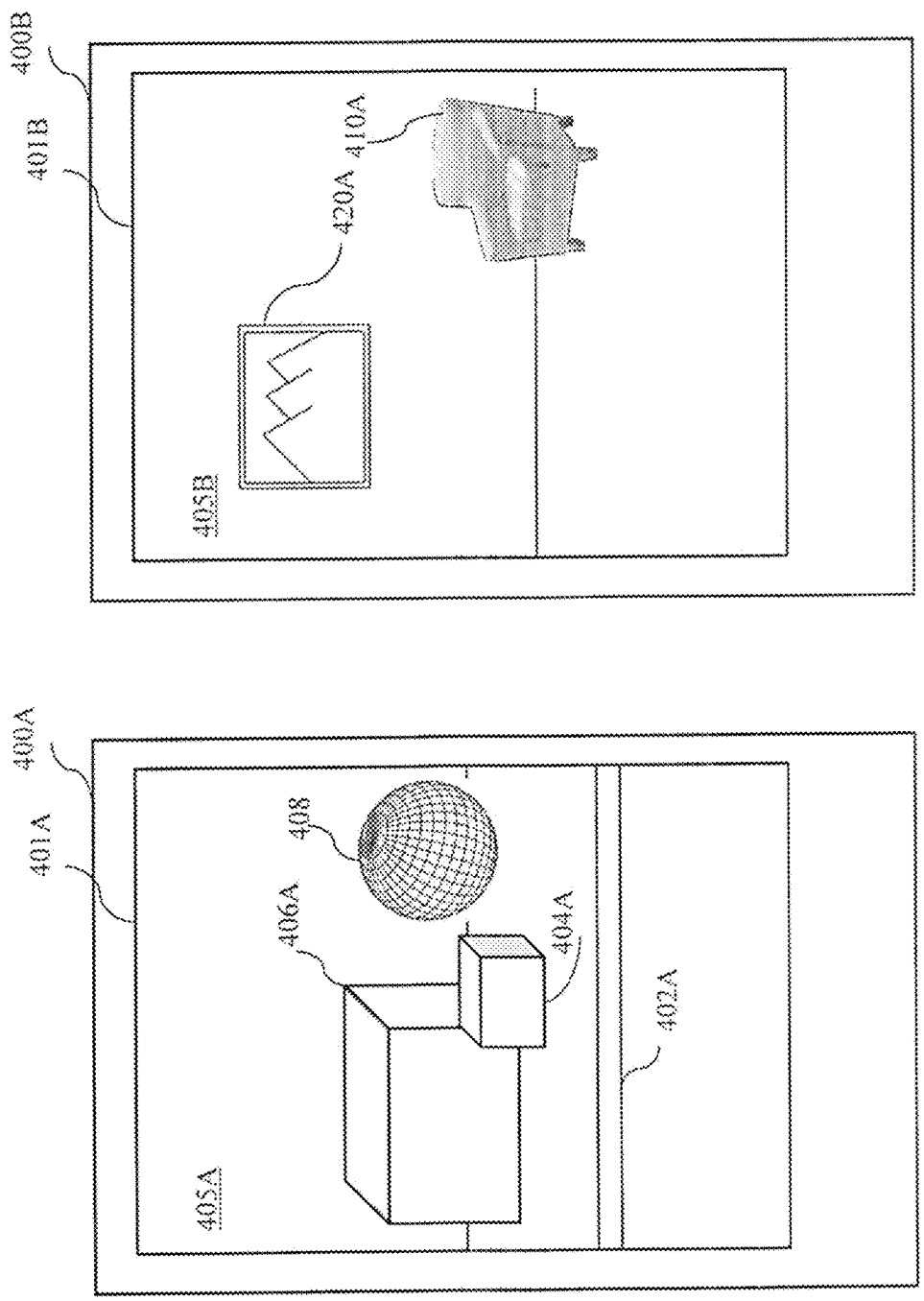

The electronic device 400A and the electronic device 400B can continue moving. As shown in FIG. 4C, the electronic device 400A has moved and a virtual object 408 has been added and is displayed in the display 401A. As shown in FIG. 4C, the electronic device 400B has turned to view a picture 420 in the physical environment 405 and a corresponding representation of a picture 420A is also shown in the display 401B.

Then, in some implementations, the electronic device 400A determines a relative transformation between the electronic device 400B and itself in the physical environment 405. In some implementations, the electronic device 400A determines the relative transformation by comparing a plurality of poses of the electronic devices 400A and 400B in the physical environment 405 and corresponding distances therebetween (e.g., from UWB sensors).

In some implementations, a shared CGR environment between the electronic devices 400A and 400B is achieved by spatially aligning their respective trajectories by computing the relative transformation between the global coordinates of the electronic devices 400A and the global coordinates of the electronic devices 400B. In some implementations, the relative transformation between the global coordinates of the electronic devices 400A and the global coordinates of the electronic devices 400B is a 4 degrees of freedom (DOF) transformation. In some implementations, the 4 DOF transformation of the relative transformation is a 3D position (e.g., x, y, z) and yaw (e.g., rotation around vertical or z).

In some implementations, computing the relative transformation between the electronic devices 400A and 400B includes a two step process where a first step is to compute initial estimate of the relative transformation and reject outliers in the range measurements, and a second step is a refinement or error reduction process (e.g., solving a weighted least squares problem).

In some implementations, the first step includes computing the initial estimate of relative transformation between the electronic device 400A and the electronic device 400B. In some implementations, the first step uses a plurality of pairs of poses of the electronic devices 400A and 400B and the corresponding range measurements between the paired poses. In one implementation, the plurality of pairs of poses is 4 pairs of poses and the corresponding 4 range measurements are used to compute the initial estimate of relative transformation between the electronic devices 400A and 400B at the time of the paired poses. In some implementations of the first step, the plurality of pairs of poses and the corresponding range measurements between the electronic devices 400A and 400B are used to compute a set of multiple initial solutions that are all potentially (e.g., equally) valid. Then, an additional pair of poses and the corresponding range measurement between the electronic devices 400A and 400B is used to test the initial set of transformation results and identify a single one of the initial set as the solution to the first step. In some implementations, the first step is called a minimal solution, which computes a set of initial estimates of the relative transformation, and that is followed by outlier rejection to select one solution from the set of initial estimates as the initial relative transformation between the poses of the electronic devices 400A and 400B, and to reject outliers in the range measurements. In some implementations, the first step uses a random sampling and consensus (RANSAC) model. In some implementations, the first step uses the RANSAC model to solve a relative translation between a plurality of paired poses with UWB range measurements of the electronic devices 400A and 400B in 4 DOF.

In some implementations, the second refinement step includes reducing or minimizing two different types of error constraints. In some implementations, the second refinement step includes reducing a range measurement cost and reducing a pose cost. In some implementations, the range measurement cost is a difference between a range measurement and its range measurement estimate. In some implementations, the pose cost is a prior pose cost from position tracking (e.g., VIO). In some implementations, the prior pose measurement cost is determined for each of the plurality of paired poses for each of the electronic devices 400A and 400B.

In some implementations, the second refinement step includes combining the two types of constraints in an error reduction process to obtain the final refined relative transformation. In some implementations, the second refinement step includes combining the two types of constraints into a weighted least squares analysis where the overall cost is reduced or minimized to obtain the final refined transformation.

Figure 4D:
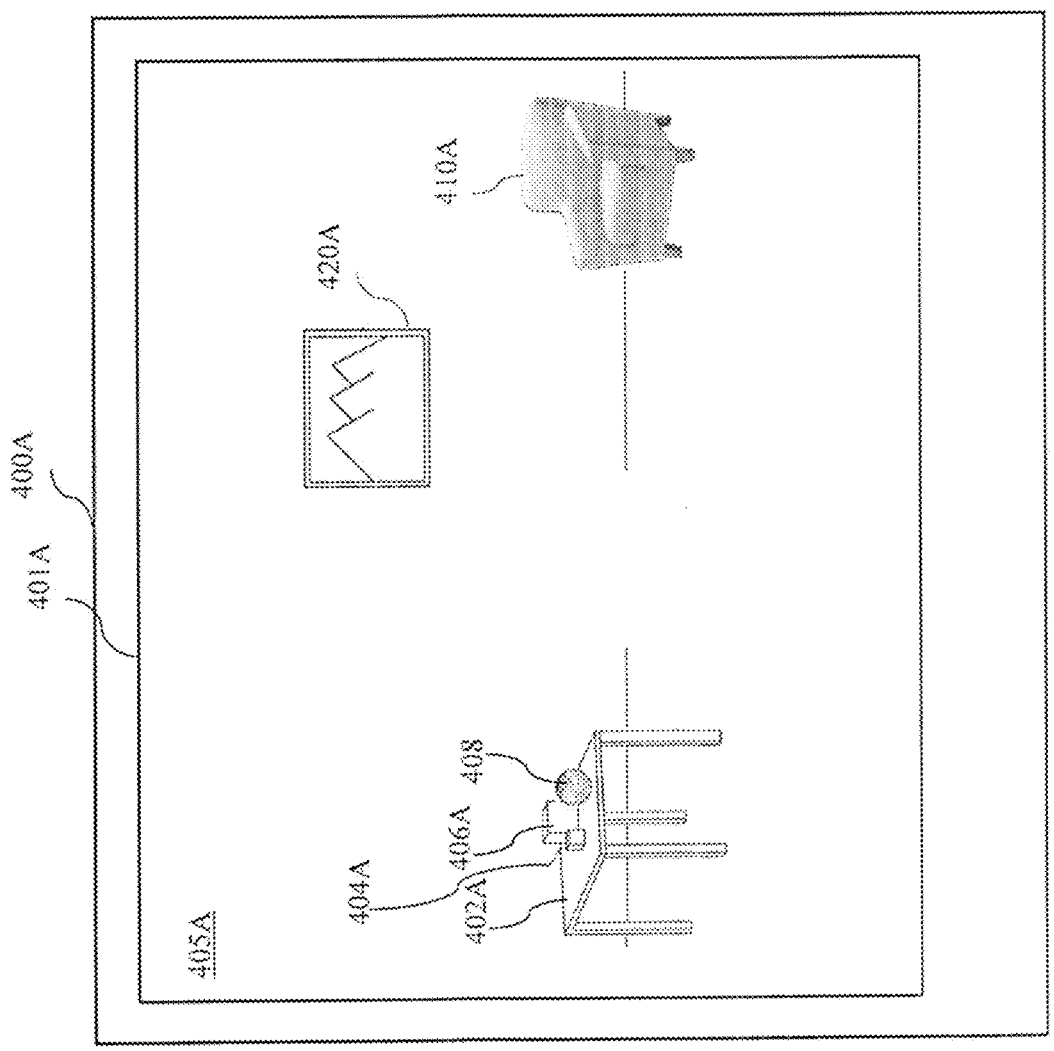

Upon determining the relative transformation between the electronic devices 400A and 400B using the UWB range information (e.g., using the 2 step process), the electronic device 400A can initiate or join a shared CGR environment with the electronic device 400B. As shown in FIG. 4D, the electronic device 400A can align poses or partial trajectories of the electronic devices 400A and 400B to display information of the electronic device 400B in the display 401A. As shown in FIG. 4D, a shared CGR environment 405C includes the CGR environment 405A and at least some of the CGR environment 405B.

Figure 4E:
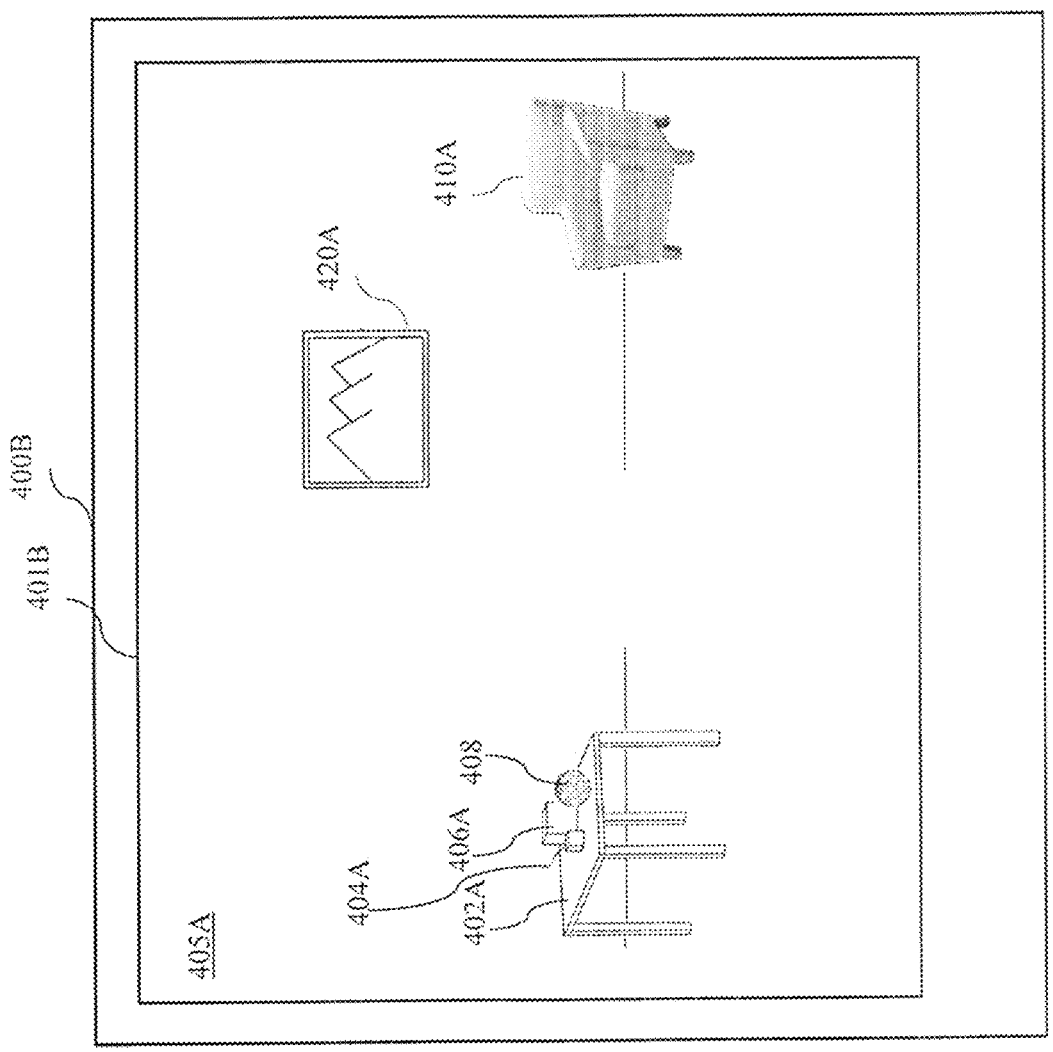

As shown in FIG. 4E, the electronic device 400B can determine the relative transformation between the electronic devices 400A and 400B using the plurality of pairs of poses with UWB ranges as described above with respect to electronic device 400A to initiate or join the shared CGR environment 405C with the electronic device 400A.

In some implementations, the UWB communications (e.g., range information) between the electronic devices 400A and 400B do not have to be maintained. In some implementations, the UWB communications between the electronic devices 400A and 400B are used to generate a relative transformation between the electronic device 400A and the electronic device 400B a single time. In some implementations, the UWB communications between the electronic device 400A and the electronic device 400B are used when available to correct any errors that develop between inter-device positioning determinations over time.

In some implementations, the relative transformation between the coordinates of the electronic devices 400A and the coordinates of the electronic devices 400B is computed after a prescribed amount of motion by each of the electronic devices 400A and 400B or a prescribed amount of time has passed. In some implementations, a motion-based monitor acts as a trigger to imitate the relative transformation calculation after a predetermined minimum amount of movement occurs for each of the electronic devices 400A and 400B. In some implementations, a prescribed amount of time such as 10 seconds or 20 seconds of motion data is used.

In some implementations, the motion-based trigger uses the trajectory or a plurality of poses of each of the users in the physical environment. In some implementations, the motion-based trigger determines when an amount of 3D movement of each of the users in the physical environment exceeds a threshold before the relative transformation calculation is initiated. In some implementations, a covariance of each of the poses for each of the electronic devices 400A and 400B is computed and analyzed. In one implementation, an eigenvalue of the covariance in the trajectory (e.g., at multiple poses) is computed for both of the electronic devices 400A and 400B. The eigenvalue of covariances of the trajectories is related to how complicated the movement is in each direction of the eigenvalue. In some implementations, the motion-based trigger determines when the eigenvalue for both of the electronic devices 400A and 400B is large enough before initiating the relative transformation calculation. In some implementations, once the motion-based trigger is satisfied, the relative transformation calculation can be repeatedly performed.

Although FIG. 4A-4E are described with respect to relative transformation between the global coordinates of the electronic devices 400A and the global coordinates of the electronic devices 400B, any number of mobile electronic device can be used.

In some implementations, the electronic device 400A performs sensor fusion using ranges from the UWB sensors and poses from image and inertial sensors of the electronic devices 400A and 400B (e.g., from VIO or SLAM). In some implementations, the electronic device 400A performs sensor fusion of ranges and directions (e.g., angle of arrival) from the UWB sensors and poses of the electronic devices 400A and 400B.

As shown in FIGS. 4A-4E, in some implementations, to begin a shared CGR environment, the electronic device 400A is joined by the electronic device 400B; or the electronic device 400B is joined by the electronic device 400A. In various implementations, the shared CGR environment can be joined using a networking layer. In some implementations, the networking layer can be any conventional networking layer implemented by the electronic devices. In some implementations, the networking layer has no delay requirements (e.g., minimum message transfer times). In some implementations, upon joining the shared CGR environment data is shared or exchanged. In some implementations, the shared data includes sending a current relative transformation. In some implementations, the shared data includes sending a portion or a current state of the local trajectory or CGR environment of each electronic device to all other electronic devices in the multiuser shared CGR environment.

FIG. 5 is a flowchart illustrating an exemplary method of determining a transform relating poses of two mobile electronic devices in a shared CGR environment using range date from a UWB sensor in accordance with some implementations. In some implementations, the method 500 is performed by a device (e.g., controller 100 or electronic device 120 of FIGS. 1-3). The method 500 can be performed for CGR environments using an electronic device or by multiple devices in communication with one another. In some implementations, the method 500 is performed by processing logic, including hardware, firmware, software, or a combination thereof. In some implementations, the method 500 is performed by a processor executing code stored in a non-transitory computer-readable medium (e.g., a memory).

At block 510, the method 500 determines a distance between a first mobile device and a second mobile device in a physical environment based on an ultra wideband (UWB) signal transmitted between the first mobile device and the second mobile device. In some implementations, UWB signals could be transmitted or received in either direction or both directions between the first mobile device and the second mobile device. In some implementations, UWB signals include an angle between the first mobile device and the second mobile device in addition to a distance therebetween. In some implementations, the distance is determined based on a first UWB signal transmitted by the first mobile device and received by the second mobile device, or a second UWB signal transmitted by the second mobile device and received by the first mobile device.

At block 520, the method 500 receives first movement data corresponding to movement of the first mobile device, the first movement data based on a camera or a sensor on the first mobile device. In some implementations, the first mobile device determines its own pose (e.g., 3D position and orientation) in a first 3D coordinate system, for example using VIO or SLAM. In some implementations, the first mobile device determines the pose of the first mobile device relative to a prior pose (e.g., starting position) of the first mobile device. In some implementations, the first mobile device determines its current pose based on image data captured by a camera on the first mobile device. In some implementations, the first mobile device determines a pose graph of its movements from a starting position.

At block 530, the method 500 receives second movement data corresponding to movement of the second mobile device, the second movement data based on a camera or a sensor on the second mobile device. In some implementations, the second mobile device determines its own pose (e.g., 3D position and orientation) in a second 3D coordinate system, for example using VIO or SLAM. In some implementations, the second mobile device determines the pose of the second mobile device relative to a prior pose (e.g., starting position) of the second mobile device. In some implementations, the second mobile device determines its current pose based on image data captured by a camera on the second mobile device. In some implementations, the second mobile device determines a pose graph of its movements from a starting position.

At block 540, the method 500 determines a transform relating a pose (e.g., position and orientation) of the first mobile device to a pose (e.g., position and orientation) of the second mobile device based on the distance, the first movement data, and the second movement data. In some implementations, the transform determines a 4 degrees of freedom relative transform between a first global coordinate system of the first mobile device and a second global coordinate system of the second mobile device.

In some implementations, the transform allows the first mobile device and the second mobile device to be users in a shared CGR environment.

In some implementations, the first movement data includes multiple or at least 4 poses of the first mobile device, and the second movement data includes multiple or at least 4 poses of the second mobile device. In some implementations, the first movement data and the second movement data include position tracking data using visual odometry, visual inertial odometry, localization and mapping, or simultaneous localization and mapping.

In some implementations at block 540, the method 500 generates an initial estimate for the transform from a plurality of poses and corresponding range measurements for each of the first mobile device and the second mobile device. In some implementations, the method 500 performs pose and range error reduction processing on the initial estimate to determine the transform. In some implementations at block 540, the method 500 generates a candidate set of transform estimates from the plurality of poses and the corresponding range measurements, and selects the initial estimate from the candidate set of transform estimates using at least one additional pose and corresponding range measurement.

In some implementations at block 540, the method 500 monitors an initial movement of the first mobile device and the second mobile device and determines the transform after the initial movement is greater than or equal to a threshold value. In some implementations at block 540, determining the initial movement for each of the first mobile device and the second mobile device includes determining a covariance for a plurality of poses (e.g., partial trajectory) for each of the first mobile device and the second mobile device.

In some implementations, the CGR environment is shared between the first mobile device and the second mobile device to form a multi-user CGR experience. In some implementations, the multi-user CGR experience includes 3 or more mobile devices. In some implementations, the CGR environment includes a virtual object at corresponding positions in a CGR environment presented at the first mobile device and the second mobile device, respectively, based on the transform.

In some implementations, visual data of the first movement data and visual data of the second movement data do not overlap. In some implementations, the method 500 allows a plurality of mobile electronic devices to simultaneously map the physical environment (e.g., a building) without duplicating or overlapping portions of the mapped area.

Figure 6:
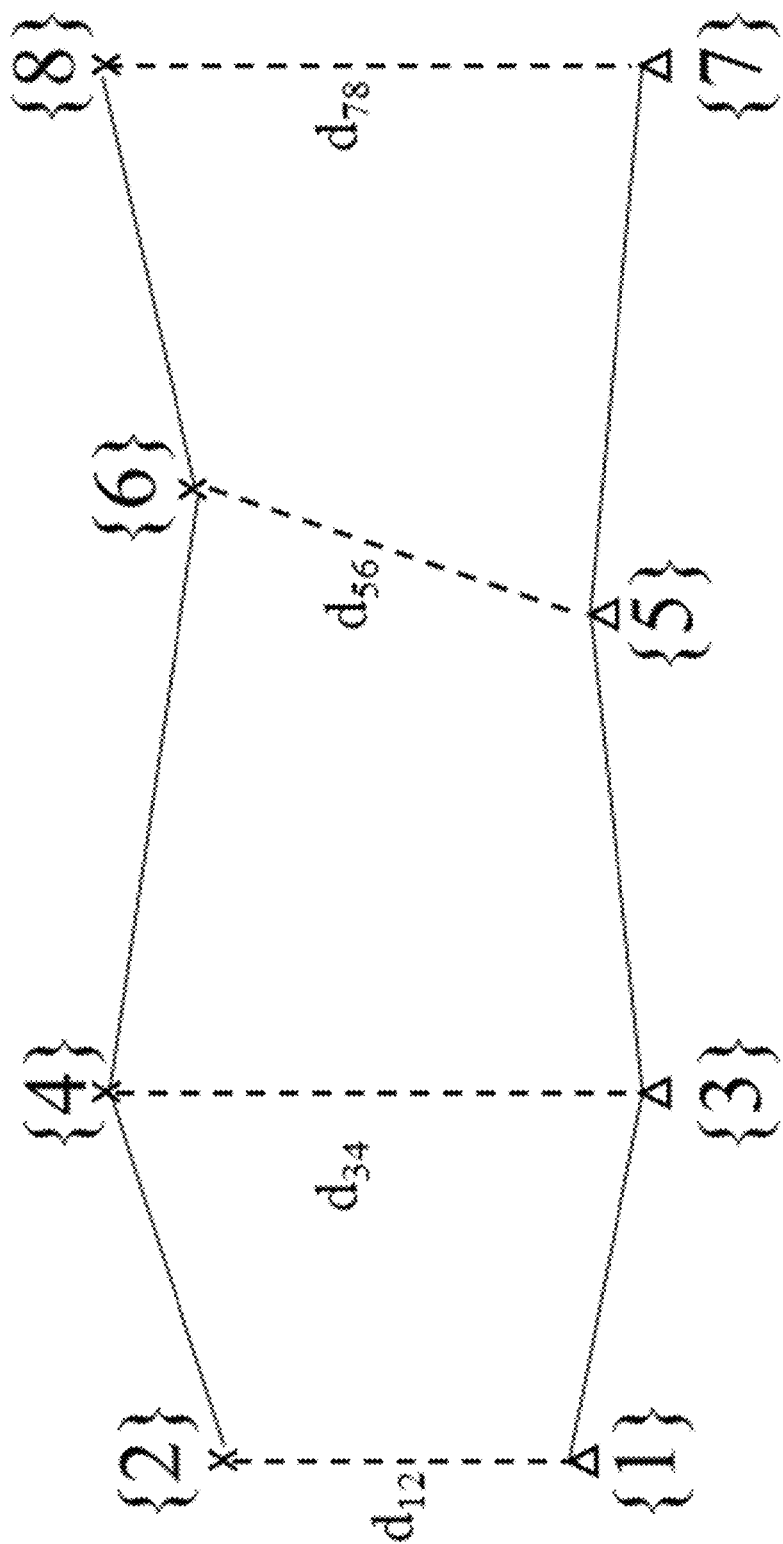
FIG. 6 is a diagram that illustrates poses of users at different timesteps and the distances between them in accordance with some implementations.

In one implementation at block 540, the transform that relates a pose (e.g., position and orientation) of the first mobile device to a pose (e.g., position and orientation) of the second mobile device based on the distance, the first movement data, and the second movement data is determined as follows using equations (1)-(19) with reference to FIG. 6:
Given poses from 2 users (e.g., mobile devices), and the distances between them.
$\{G_1\}$=gravity-aligned frame of reference of device 1
$\{G_2\}$=gravity-aligned frame of reference of device 2
$_A^B R$=rotational matrix that rotates vectors with respect to frame $\{A\}$ to be expressed with respect to frame $\{B\}$
$^B P_C$=position of point (or origin of a frame) C with respect to frame $\{B\}$
Known: $d_{2i-1,2i}$=distances between the 2 users, i=1, 2, 3, 4
$^{G1}P_{2i-1}$, $_{2i-1}^{G1}R$: position and rotation matrix of device 1 at different timesteps in global coordinates of device 1
$^{G2}P_{2i}$, $_{2i}^{G2}R$: position and rotation matrix of device 2 at different time stops in global coordinate of device 2
Find a relative pose $^{G1}P_{G2}$ and $_{G2}^{G1}=R(\varphi)$, which is a function of yaw, $\varphi$, from device 2 to device 1. Therefore it is a 4 degrees of freedom (DOF) problem.
We know:

$$d_{2i-1}, 2i^2 = {}^{2i-1}P_{2i}{}^\tau \cdot {}^{2i-1}P_{2i} \quad (1)$$

Where $${}^{2i-1}P_{2i} = {}^{2i-1}_{G1}R \cdot ({}^{G1}P_{2i} - {}^{G1}P_{2i-1}) \quad (2)$$

$$= {}^{2i-1}_{G1}R^\tau \cdot ({}^{G1}_{G2}R \cdot {}^{G2}P_{2i} + {}^{G1}P_{G2} - {}^{G1}P_{2i-1}) \quad (3)$$

Drop $\{G_1\}$, $\{G_2\}$ for simplicity, i.e., define:

$$R \triangleq {}^{G1}_{G2}R \quad (4)$$

$$P \triangleq {}^{G1}P_{G2} \quad (5)$$

$$P_{2i} \triangleq {}^{G2}P_{2i} \quad (6)$$

$$P_{2i-1} \triangleq {}^{G1}P_{2i-1} \quad (7)$$

$$\Rightarrow {}^{2i-1}P_{2i} = {}^{G1}_{2i-1}R\tau \cdot (R \cdot P_{2i} + P - P_{2i-1}) \quad (8)$$

$$\Rightarrow d_{2i-1}, 2i^2 = {}^{2i-1}P_{2i}{}^\tau \cdot {}^{2i-1}P_{2i} \quad (9)$$

$$= (P_{2i}^\tau \cdot R^\tau + P^\tau - P_{2i-1}\tau) \cdot (R \cdot P_{2i} + P - P_{2i-1}) \quad (10)$$

$$= \underbrace{P_{2i}^\tau \cdot P_{2i}}_{\delta_{2i}^2} + P^\tau \cdot P + \underbrace{P_{2i-1}^\tau \cdot P_{2i-1}}_{\delta_{2i-1}^2} + \quad (11)$$

$$2P_{2i}^\tau \cdot R^\tau \cdot P - 2P_{2i}^\tau \cdot R^\tau \cdot P_{2i-1} - 2 \cdot P^\tau \cdot P_{2i-1}$$

Also, $d_{12}^2 = P^\tau \cdot P \quad (12)$ because $P_2 = P_1 = O_{3 \times 1} \quad (13)$ $$\Rightarrow \underbrace{\frac{1}{2}(d_{2i-1}, 2i^2 - \delta_{2i}^2 - \delta_{2i-1}^2 - d_{12}^2)}_{\triangleq Z_{2i-1, 2i}} = \quad (14)$$

$$P_{2i}^\tau \cdot R^\tau \cdot P - P_{2i}^\tau \cdot R^\tau \cdot P_{2i-1} - P_{2i-1}^\tau \cdot P$$

$$\Rightarrow \underbrace{Z_{2i-1}, 2i + P_{2i}^\tau \cdot R^\tau \cdot P_{2i-1}}_{b_{2i-1, 2i}(\varphi)} = \underbrace{(P_{2i}^\tau \cdot R^\tau - P_{2i-1}^\tau)}_{a_{2i-1, 2i}(\varphi)^\tau \cdot P} \cdot P, i = 2, 3, 4 \quad (15)$$

By stacking equations with i=2, 3, 4, we get $$\underbrace{\begin{bmatrix} b_{34} \\ b_{56} \\ b_{78} \end{bmatrix}}_{b(\varphi)} = \underbrace{\begin{bmatrix} a_{34}^\tau \\ a_{56}^\tau \\ a_{78}^\tau \end{bmatrix}}_{b(\varphi)} \cdot P \quad (16)$$

Where $b(\varphi)$ is a 3×1 vector, and is a linear function of $\sin(\varphi)$ and $\cos(\varphi)$ $A(\varphi)$ is a 3×3 matrix, and is also a linear function of $\sin(\varphi)$ and $\cos(\varphi)$ $$(16) \Rightarrow P = A(\varphi)^{-1} \cdot b(\varphi) \quad (17)$$

And since $d_{12}{}^2 = P^r \cdot P$ from equation (12)

$$\Rightarrow d_{12}^2 - b(\varphi)^\tau \cdot A(\varphi)^{-\tau} \cdot A(\varphi)^{-1} \cdot b(\varphi) = 0 \quad (18)$$

Which is a $4^{th}$ order polynomial with respect to $\sin(\varphi)$ and $\cos(\varphi)$ Recall $\sin(\varphi)^2 + \cos(\varphi)^2 = 1 \quad (19)$ Since equations (18) and (19) form a system of two equations in two variables $$\begin{cases} u = \cos(\varphi) \\ v = \sin(\varphi) \end{cases};$$

it can be analytically solved by building the Sylvester matrix, which corresponds to an $8^{th}$ order univariable polynomial equation in e.g., $u=\cos(\varphi)$ Once we determine $\cos(\varphi)$, we can compute $\sin(\varphi)$ from (18). With $\sin(\varphi)$ and $\cos(\varphi)$, we back-substitute into (17) to get P.

In some implementations at blocks 520 and 530, the image data of the physical environment is obtained using a sensor (e.g., camera) on the mobile electronic device (e.g., smart phone) having a processor. In some implementations, the image data is a 2D image or a 3D image. In some implementations, the sensor can be a RGB camera, a depth sensor, a RGB-D camera, one or more 2D cameras, IR cameras, or the like. In some implementations, combinations of sensors are used. In some implementations, the sensor is used to generate a CGR environment representing the physical environment. In some implementations, the CGR environment is generated using VIO or SLAM position tracking or the like at the electronic device. In some implementations, color images can be used. Alternatively, in some implementations, grayscale images can be used.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

In some implementations, a system includes a non-transitory computer-readable storage medium; and one or more processors coupled to the non-transitory computer-readable storage medium, wherein the non-transitory computer-readable storage medium includes program instructions that, when executed on the one or more processors, cause the system to perform exemplary methods disclosed herein. In some implementations, a non-transitory computer-readable storage medium, stores program instructions computer-executable on a computer to perform operations including exemplary methods disclosed herein.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various objects, these objects should not be limited by these terms. These terms are only used to distinguish one object from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "or" as used herein refers to and encompasses any and all possible combinations of one or more of the associated listed items. It will be further understood that the terms "comprises" or "comprising," when used in this specification, specify the presence of stated features, integers, steps, operations, objects, or components, but do not preclude the presence or addition of one or more other features, integers, steps, operations, objects, components, or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations, but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
 at a processor:
  determining a distance between a first mobile device and a second mobile device based on a ultra-wideband (UWB) signal transmitted between the first mobile device and the second mobile device;

receiving first three-dimensional (3D) movement data corresponding to movement of the first mobile device, the first 3D movement data based on a camera or a sensor on the first mobile device;

receiving second 3D movement data corresponding to movement of the second mobile device, the second 3D movement data based on a camera or a sensor on the second mobile device; and determining, responsive to determining that the first 3D movement data exceeds a first threshold amount of 3D movement based on a measure of movement complexity in a direction for the first mobile device and determining that the second 3D movement data exceeds a second threshold amount of 3D movement based on a measure of movement complexity in a direction for the second mobile device, a transform relating a position and orientation of the first mobile device to a position and orientation of the second mobile device based on the distance, the first 3D movement data, and the second 3D movement data.

2. The method of claim 1, wherein:

the first 3D movement data comprises a different position and orientation of the first mobile device relative to a prior position and orientation of the first mobile device based on image data captured by a first camera on the first mobile device; and the second 3D movement data comprises a different position and orientation of the second mobile device relative to a prior position and orientation of the second mobile device based on image data captured by a second camera on the second mobile device.

3. The method of claim 1, wherein:

the first 3D movement data comprises multiple positions and orientations of the first mobile device; and the second 3D movement data comprises multiple positions and orientations of the second mobile device.

4. The method of claim 1, wherein either the first 3D movement data or the second 3D movement data comprises position and orientation tracking data using visual odometry or visual inertial odometry.

5. The method of claim 1, wherein the distance is determined based on a first UWB signal transmitted by the first mobile device and received by the second mobile device and a second UWB signal transmitted by the second mobile device and received by the first mobile device.

6. The method of claim 1, further comprising determining an angle of arrival of the UWB signal transmitted between the first mobile device and the second mobile device.

7. The method of claim 1, wherein the transform determines a 4 degrees of freedom relative transformation between a first global coordinate system of the first mobile device and a second global coordinate system of the second mobile device.

8. The method of claim 1, further comprising:

generating an initial estimate for the transform;

determining a plurality of positions, orientations, and corresponding range measurements for each of the first mobile device and the second mobile device; and rejecting outliers in the corresponding range measurements.

9. The method of claim 8, wherein determining the initial estimate further comprises:

generating a candidate set of transform estimates from the plurality of positions, orientations, and range measurements; and selecting the initial estimate from the candidate set of transform estimates using at least one position, orientation, and range measurement for said each of the first mobile device and the second mobile device.

10. The method of claim 1, further comprising:

determining a range difference between a range measurement estimate and an actual range measurement between the first mobile device and the second mobile device; and determining a prior position and orientation measurement error based on a plurality of position and orientation measurements of the first mobile device or the second mobile device;

wherein determining the transform comprises reducing a weighted cumulative error of the range difference and the prior position and orientation measurement error.

11. The method of claim 1, wherein determining that the first 3D movement data exceeds the first threshold amount of 3D movement based on a measure of movement complexity in a direction for the first mobile device and the second 3D movement data exceeds the second threshold amount of 3D movement based on a measure of movement complexity in a direction for the second mobile device comprises:

determining an initial movement of the first mobile device and an initial movement of the second mobile device;

comparing the initial movement of the first mobile device to the first threshold amount of 3D movement; and comparing the initial movement of the second mobile device to the second threshold amount of 3D movement.

12. The method of claim 1, wherein determining that the first 3D movement data exceeds the first threshold amount of 3D movement based on a measure of movement complexity in a direction for the first mobile device comprises determining whether an eigenvalue of a covariance for a plurality of positions and orientations for the first mobile device exceeds the first threshold amount of 3D movement, and wherein determining that the second 3D movement data exceeds the second threshold amount of 3D movement based on a measure of movement complexity in a direction for the second mobile device comprises determining whether an eigenvalue of a covariance for a plurality of positions and orientations for the second mobile device exceeds the second threshold amount of 3D movement.

13. The method of claim 1, further comprising sharing a CGR environment between the first mobile device and the second mobile device.

14. The method of claim 1, further comprising displaying a virtual object at corresponding positions in a CGR environment presented at the first mobile device and the second mobile device, respectively, based on the transform.

15. The method of claim 1, wherein visual data of the first 3D movement data and visual data of the second 3D movement data does not overlap.

16. The method of claim 1, wherein visual data of the first 3D movement data and visual data of the second 3D movement data are used simultaneously to map a building or object.

17. The method of claim 1, further comprising a third mobile device, wherein the first mobile device determines an additional transform relating the position and orientation of the first mobile device to a position and orientation of the third mobile device based on a distance between the first mobile device and the third mobile device based on an additional UWB signal, the first 3D movement data, and third 3D movement data corresponding to movement of the third mobile device based on a camera or a sensor on the third mobile device.

18. The method of claim 17, wherein visual data of the first 3D movement data, visual data of the second 3D movement data, and visual data of the third 3D movement data do not overlap.

19. A system comprising:
a non-transitory computer-readable storage medium; and
one or more processors coupled to the non-transitory computer-readable storage medium, wherein the non-transitory computer-readable storage medium comprises program instructions that, when executed on the one or more processors, cause the system to perform operations comprising:
  determining a distance between a first mobile device and a second mobile device based on a ultra-wide-band (UWB) signal transmitted between the first mobile device and the second mobile device;
  receiving first three-dimensional (3D) movement data corresponding to movement of the first mobile device, the first 3D movement data based on a camera or a sensor on the first mobile device;
  receiving second 3D movement data corresponding to movement of the second mobile device, the second 3D movement data based on a camera or a sensor on the second mobile device; and
  determining, responsive to determining that the first 3D movement data exceeds a first threshold amount of 3D movement based on a measure of movement complexity in a direction for the first mobile device and the second 3D movement data exceeds a second threshold amount of 3D movement based on a measure of movement complexity in a direction for the second mobile device, a transform relating a position and orientation of the first mobile device to a position and orientation of the second mobile device based on the distance, the first 3D movement data, and the second 3D movement data.

20. A non-transitory computer-readable storage medium, storing program instructions computer-executable on a computer to perform operations comprising:
at an electronic device having a processor:
  determining a distance between a first mobile device and a second mobile device based on a ultra-wide-band (UWB) signal transmitted between the first mobile device and the second mobile device;
  receiving first three-dimensional (3D) movement data corresponding to movement of the first mobile device, the first 3D movement data based on a camera or a sensor on the first mobile device;
  receiving second 3D movement data corresponding to movement of the second mobile device, the second 3D movement data based on a camera or a sensor on the second mobile device; and
  determining, responsive to determining that the first 3D movement data exceeds a first threshold amount of 3D movement based on a measure of movement complexity in a direction for the first mobile device and the second 3D movement data exceeds a second threshold amount of 3D movement based on a measure of movement complexity in a direction for the second mobile device, a transform relating a position and orientation of the first mobile device to a position and orientation of the second mobile device based on the distance, the first 3D movement data, and the second 3D movement data.

* * * * *